H. R. EVANS.
COMBINED REFLECTOR AND SOURCE OF LIGHT IN THE SAME.
APPLICATION FILED JULY 20, 1917.
1,239,371. Patented Sept. 4, 1917.
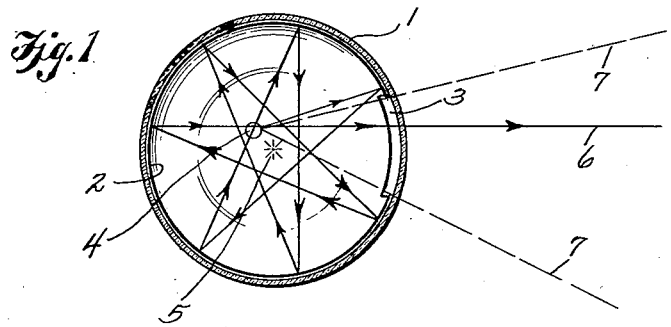
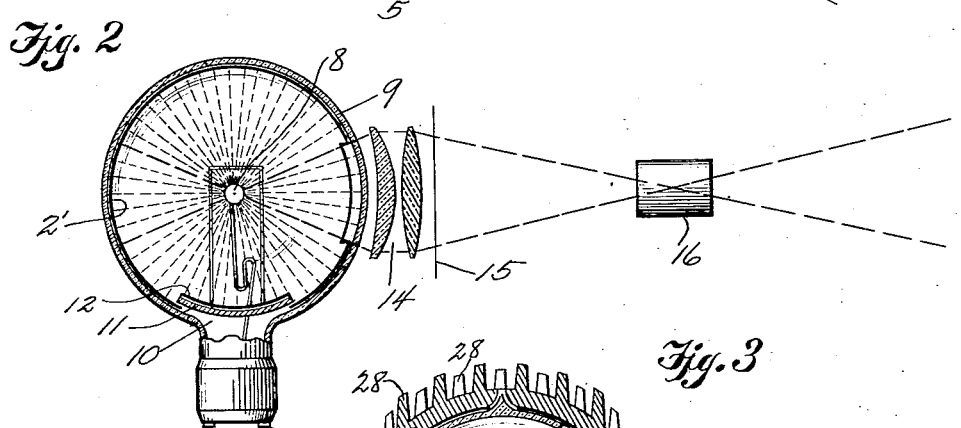
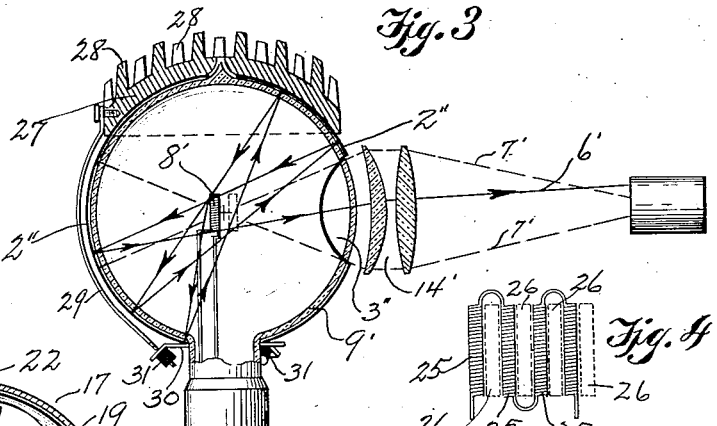
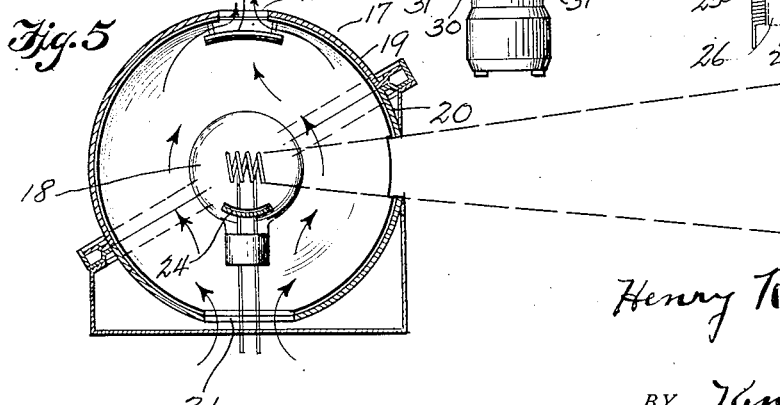
Henry R. Evans
INVENTOR.
BY Kenyon & Kenyon
ATTORNEYS

UNITED STATES PATENT OFFICE.

HENRY R. EVANS, OF NEW YORK, N. Y.

COMBINED REFLECTOR AND SOURCE OF LIGHT IN THE SAME.

1,239,371. Specification of Letters Patent. Patented Sept. 4, 1917.

Application filed July 20, 1917. Serial No. 181,720.

*To all whom it may concern:*

Be it known that I, HENRY R. EVANS, a citizen of the United States, and a resident of the borough of Manhattan, city, county, and State of New York, have invented certain new and useful Improvements in Combined Reflectors and Source of Light in the Same, of which the following is a specification.

My invention relates to a combined reflector and source of light within the same.

The invention is especially useful in connection with electric lamps of the inclosed type known as incandescent lamps.

The principal object of the invention is to provide a reflector lamp (*i. e.*, a reflector having a light source located within the same and having a window for the emission of light) so arranged and constructed that a greater number of light rays emitted from the source can be effectively controlled and utilized for projection purposes than has heretofore been accomplished.

In the projection of a beam of light the shape or configuration of the beam is predetermined according to the use to which it is to be put, and in order to get the greatest intensity and control it is necessary both to project from the reflector-lamp as many of the total light rays emitted from the source as possible, and also to have them project in such direction that they can thereafter be efficiently dealt with or controlled, so that as many of them as possible may ultimately lie within the desired predetermined beam. If both of these factors are not attained, the desired beam will lack intensity because there will either be a large number of lost rays that are never directed into the beam, or stray rays that do not sufficiently conform in angular relation to the remaining rays composing the beam to be useful in reinforcing it, but instead pass out into space surrounding the beam. These stray rays cannot be dealt with in common with the other rays by any known optical system designed for dealing with said other rays because their angular relation does not conform sufficiently to the other rays. If an optical means is chosen suitable to control, redirect or bend into a sharply defined beam, the rays that are not too widely divergent one from another, the same optical means will be unable to control or bend the stray or considerably more divergent rays into the desired beam of light, because these latter rays are emitted at such different angles from the others.

Heretofore either a small part of the total light rays emitted from a source have been efficiently dealt with to form a predetermined beam, or else a large part of the total rays emitted from the source has been dealt with inefficiently. The result in each case being inefficient, and resulting in an unnecessary loss of light to the beam.

According to my invention I deal efficiently with a large amount of the total rays emitted from the source. My invention contemplates the use of a spherical reflector with a suitable light opening and with a concentrated source of light arranged within the reflector, as hereinafter described.

Since, in light reflection, the angle of incidence is equal to the angle of reflection, if, theoretically, a fine point of light be placed at the center of a spherical reflector having a small light opening, all the light rays from the point source that strike the reflector will strike it normal to its surface (the rays being truly radial), and hence all the light rays except those that pass directly from the point source out through the opening and those that are reflected through the opening from the area of the reflector diametrically opposite the opening, will continue to be reflected back and forth between the source and the reflector along the same lines until lost by absorption or attrition, and hence will never find their way out of the reflector. In view of this phenomenon it appears to have been the belief among those skilled in the art that the light rays from any concentrated source located at the center of a spherical reflector having a small light window will also act substantially in this way; and that therefore spherical reflectors having a reflecting area greater than one-half the sphere were not advantageous where it was desired to get as much light as possible from a concentrated source into a controllable beam of light. I make this statement because, notwithstanding the age and development of the reflector art and the results obtained from my invention, no one, so far as I know, has ever utilized this combination; and further, because of the skepticism of some of those skilled in the art with whom I have conferred relative to my invention.

It is true that if in practice a source of light be placed right at the center of a spherical reflector (having a light opening) and made so small with respect to the spherical reflector that there will not be enough incandescent area off center to produce sufficient rays that are not truly radial, the combination will prove very inefficient because of the exhaustion, so to speak, of a large number of light rays within the reflector which either do not eventually get out of the opening by re-reflection, or else have such a slow rate of "gyration of reflections" that they are so exhausted or absorbed by repeated re-reflections that they are comparatively feeble when they do escape through the opening. By "gyration of reflections" I mean the angular movement, travel or shift of direction of a ray about the center of a reflector due to its repeated reflections when it emanates from a point of the source off the center. And it is further true that if too extended a source be used with respect to the size of the spherical reflector (such, for example, as an elongated electric filament source), this combination likewise is unsuited for the efficient collection and projection of the light rays into the desired predetermined beam, because of the widely divergent character of the reflected rays that emanate from the relatively extensive area of the source, which prevents the majority of them being controlled and bent by known optical means to conform to the predetermined beam of light. But I have discovered that if a concentrated source of light be used centrally of a spherical reflector having an opening for the passage of the light, the source being small enough to insure that such light rays as pass out through the opening will pass in the desired direction to be efficiently controlled by suitable optical means, and being placed somewhat off center (or having sufficient area off center) to prevent too many rays striking the reflector too nearly radially, so as to insure the desired rate of "gyration of reflections" of the rays, so that they will pass out of the opening before being too greatly exhausted; a device is obtained through the window of which an unusually large number of total light rays emitted from the source are projected, and, moreover, at such angles that an unusually large number of them can be efficiently controlled or bent into the desired predetermined beam of light by the same optical means. In other words, substantially all of the large number of rays passing through the opening of the reflector appear as coming from a concentrated area. The source even if very concentrated must not be placed too far off center, or it will have the same effect, as regards divergence of rays, as too extensive a source.

In carrying out my invention I provide a substantially spherical reflector with the light opening substantially no larger than necessary to emit a beam of light of the desired size, and I place centrally within this reflector a suitable concentrated source; the electric lamp filament, or other incandescent area constituting the source, being of such area as to fall within the class known as concentrated sources, the source area varying according to the size of the reflector but always being small enough to constitute what will be understood by those skilled in the art as a concentrated source with respect to the size of the spherical reflector used. It is essential, however, that while being a concentrated source so that substantially all of the rays will appear as coming from a concentrated area so as not to be too divergent, the area off center must be large enough to insure the necessary rate of "gyration of reflections" of the respective rays in order to insure their passing out of the opening into the beam without such continued re-reflections as will absorb or greatly reduce their brilliancy before they pass into the beam, for, since each reflection consumes a certain amount of energy of the ray, if the rate of "gyration of reflections" is too slow (i. e., the number of reflections excessive) too much of the energy of the rays will be absorbed before they pass out.

My invention will be more readily understood, and further advantages and objects of the invention will more fully appear from the following description taken in connection with the accompanying drawings illustrating forms of my invention in which—

Figure 1 is a diagrammatic vertical central section through a reflector illustrating the principle embodied in this invention;

Fig. 2 is a similar view of a reflector-lamp constructed to embody this invention and applied to a projecting system of lenses;

Fig. 3 is a similar view of a modified form of reflector-lamp embodying the invention and applied to a projecting system of lenses and having a cooling device;

Fig. 4 is an enlarged detail of the electric lamp filament, used in the lamp of Fig. 3; and Fig. 5 is a vertical central section through a modified construction of reflector.

In explanation of the principle embodied in this invention, as illustrated in Fig. 1, the reflector is there seen constructed as a whole sphere of glass 1 silvered entirely over its inner surface, as indicated by the thick line 2, with the exception of a rectangular portion at 3 which is left clear to constitute the aperture through which the beam of projected light emerges. The source of light is indicated at 4, whereas the center of the sphere is indicated at 5.

It will be appreciated that if the source of light were a point at 5, and if the construction of the spherical reflecting surface were perfect, the total quantity of light emerging through the aperture 3 would be that comprised in the pyramid formed upon the base 3 with its apex at 5, plus that comprised within the similar pyramid having its apex at 5 and its base on the reflecting surface diametrically opposite to the aperture 3; this second pyramidal volume of light would escape through the aperture 3 by reason of its being reflected from the surface opposite to 3. The remaining light under the supposed conditions, which, however, would be impossible of absolute attainment in practice, would supply repeated reflections within the sphere from its center to its reflecting surface and back, since every angle of incidence would be normal to the reflecting surface.

Although the said supposed conditions are unattainable in practice by reason partly of the difficulties of manufacture, and further by reason of the source of light not being constituted as an absolute point of no dimensions, yet if a source be used in practice that is so small with respect to the diameter of the reflector that the "gyrations of reflections" of the re-reflected rays are too slow, the apparatus will be practically of no increased value over the ordinary reflector in the form of a hemisphere or a smaller sector.

It is preferred to place the source of light intentionally farther off the true center of the sphere than it would be by mere accident and difficulties if intended to be truly central. The distance between the source 4 and the center 5, indicated in Fig. 1, is not to be taken as representing to scale the displacement of the source from the center. It will be seen that with the source displaced to the position of 4 a ray of light may take the course indicated by the repeated reflections under which the ray eventually emerges along the line 6, and that this may be taken as a typical sample of the course of the majority of the rays, although obviously the number of re-reflections vary according to the direction in which the ray emanates from the source. Other rays will pass forwardly from the source 4 by a direct course, as indicated by the dotted lines 7, and constitute a direct pyramidal beam, and a similar beam will be added to this by reflection once only on the surface opposite to the aperture 3. In result, an unusually large part of the light emitted from the source 4 in every direction over the whole sphere is forwardly projected through the aperture 3. This traveling of the point of reflection of a ray around the center of the reflector is what I term the "gyration of reflections" of the ray, and if this is substantially nil, or is too slow so that the re-reflections are excessive, the apparatus will be too inefficient.

The construction shown in Fig. 2 illustrates the application of the present invention to that kind of electric lamp in which a small ball of metal, indicated at 8, is maintained at brilliant incandescence within a sealed glass bulb. The bulb is indicated at 9, and the silvering on the inner surface of the bulb indicated at 2'. While the silvering is shown on the inner surface of the bulb for the sake of convenience and clearness of illustrating the invention in the drawings, it will be understood that in practice it is often preferable to silver the outer surface of the bulb where the same is made of glass, and in that event, the outer surface of the glass, or at least the silver lining on the outer surface becomes the reflecting surface. In order to save that light which would be lost by absorption where it impinges upon the neck of the bulb at 10, a reflecting baffle 11 is provided inside the lamp at this point, silvered at 12 and curved to a curvature struck about the center of the sphere. The source 8 is intended to be slightly displaced from the truly central position.

The emerging beam is taken by a condenser 14 through a cinematograph film or like transparency 15 to a projecting lens 16. The particular arrangement of condenser, transparency and projecting lens, however, form no part of the present invention.

In Fig. 3 I have illustrated a spherical electric bulb 9' silvered on its outer surface as shown at 2'' with the concentrated source 8' arranged centrally thereof similar in general to the lamp shown in Fig. 2. In this case, however, the reflecting surface or silver coating is shown placed on the outer surface of the bulb, and a different species of electric light emitting conductor or source is used, and the silvered portion 11 closing the opening from the neck of the bulb utilized in Fig. 2 is omitted.

The silver coating, when placed on the outside, is preferably protected or covered by a suitable protective coating so as to protect it against oxidization and mechanical injury. The light opening 3'' shown in this lamp being round instead of square, as it is in Fig. 2, the openings being of any desired shape, according to the desired cross section of the emitted beam. In this modification of the invention the concentrated source is arranged centrally as in Fig. 2, and its center is placed eccentric to the true center of the sphere in order to increase the rate of gyrations of the re-reflected rays as explained; for example, in a bulb six inches in diameter I have placed the center of the concentrated source about one-eighth to three-sixteenths of an inch off the true center of the bulb with very satisfactory results. The particular concentrated source of light shown in this modification (as more clearly shown in Fig. 4) consists of a plurality of coils or convolutions 25 of the illuminating conductor or incandescent filament arranged with their axes in substantially the same plane and lying parallel one with the other and spaced equidistantly, the spacing being substantially equal to the diameter of the coils of the filament. Filaments like those shown in Figs. 4 and 5 are what I term an open-work arrangement or construction, and this is of advantage in my invention because it permits a large number of the re-reflected light rays to pass through the spaces without striking the filament or conductor itself. The particular form of filament shown in Fig. 4 is again of special advantage in my combination over that shown in Fig. 5, in that it permits of the reflected images 26 of the respective coils of the filament being located opposite the spaces between the filament coils as shown in dotted lines in Fig. 4. By setting the row of filament coils slightly off center in a direction to the rear of the window or opening, this image of the coils will be positioned in front of the row of filament coils, so that by this arrangement not only is the advantage of the eccentricity of the filament coils obtained, but the light rays emanating directly from the filament coils can pass through the reflected image of said coils, whereas if their positions were reversed, the light appearing to emanate from the image would be intercepted by the coils. Furthermore, when the image of the coils is reflected to the position shown in Fig. 4 it has the effect of giving a source of more uniform intensity throughout its area, the source in this instance being all of the area lying between the rectangular outline embracing the coils and the image of the coils. It will thus be seen that this particular form of filament in its location shown in the spherical reflector is of especial advantage in my combination.

It is well to point out that some of the re-reflected rays in passing through the incandescent concentrated area strike the light emitting conductor or filament and are thereby prevented from passing immediately through the opening to reinforce the beam, but these rays are not lost because they are either re-reflected by the brilliant filament, or their energy is absorbed by the filament in the form of heat which increases the brilliancy of the filament and is thus still utilized in this manner (which I term indirectly) in increasing the intensity of the beam.

The bulb shown in Fig. 3, like that shown in Figs. 2 and 5, is intended to be filled with any well known inert gas, such as nitrogen gas, as is now used in bulbs having concentrated filaments, and I have discovered that when it is attempted to utilize a gas filled bulb in my invention, the gas is so intensely heated from the filament that the upper portion of the bulb, which the hot column of gas strikes as it ascends from the filament, has to be provided with means for preventing it from becoming too excessively hot, otherwise not only will the reflecting coating be destroyed, but the bulb itself will become sufficiently plastic to be deformed. This intensely hot region is a relatively small one, being not more than an inch and a quarter in diameter in a six inch bulb. In order to obviate these difficulties I provide suitable cooling means, the present embodiment of which takes the form of a cap 27 of heat conducting material, such, for example, as metal, fitting the contour of this portion of the bulb, so that it not only conducts off the heat from this intensely hot region, but if this portion of the bulb should become partly plastic this firmly held and closely fitting cap-piece will retain it in its spherical form so that its efficiency will not be impaired. This cap-piece or radiator is shown as having a series of heat radiating projections 28 and is held on top of the bulb in any suitable manner such, for example, as by a series of arms 29 screwed at one end into the radiator and at their other ends secured to a suitable collar 30 by means of threaded nuts 31.

In Fig. 5 a reflecting hood 17 of metal is shown adapted to receive and contain an electrical lamp 18 at its center. The hood is made in two portions 19, 20, so that it may be readily taken apart about a plane through the center of the sphere. An opening 21 is provided at the bottom for the ingress of cold air, and a similar opening 22 at the top for the egress of hot air. This upper opening is masked by a baffle 23 similar to the baffle 12 of Fig. 2 and the lamp 18 has a baffle inside it at 24 similar to the baffle 12 of Fig. 2. The two baffles 23 and 24 in Fig. 3 are also silvered and serve in effect to maintain the optical continuity of the sphere while permitting mechanical discontinuity thereof for the purpose of ventilation and support of the filament respectively.

The construction of reflector illustrated in Fig. 5 is given by way of example to indicate the matters to which attention must be given in constructing a reflector according to this invention so as to enable renewals to take place in respect of a lamp situated inside it. The application of the invention to such conditions may be made in a variety of ways, all readily devised by those skilled in the art in the light of this invention and other than that illustrated in Fig. 5, without departing from the scope of this invention.

It should be understood that in my combination the intensity of the beam increases very rapidly as the reflecting area is extended beyond the half area of the sphere. For example, suppose for the sake of illustration we assume that we have a perfect reflecting surface over one-half of the surface of a spherical bulb, the intensity of the light or the amount of light rays then emitted through the unsilvered half of the bulb will be substantially twice what it was without the reflector, and as the silvering is extended beyond the hemispherical line it rapidly increases the intensity of the light through the opening, so that as it is extended it takes in an area of progressively increasing light intensity. It might also be pointed out that so far as concerns the intensifying of a predetermined beam of light a hemispherical reflector is very little more efficient than if a segment of a sphere were used of very substantially less area than the hemisphere. This is true, because if only half of a spherical bulb is silvered the opening through which the light rays pass is such that the rays extend over an angle embracing one hundred and eighty degrees, so that while (assuming a perfect reflector) double the amount of light comes out of the opening it is not controllable to reinforce the beam, and hence can only be dealt with very inefficiently by known optical means, whereas if only a smaller sector of the sphere were silvered of such angular embrace as would reflect rays that could be dealt with efficiently, the results from this smaller reflector would very closely proximate those from the hemispherical reflector; what difference there may be between the two in favor of the hemispherical reflector being due largely only to the reheating of the filament by reflected rays.

All openings that are additional to the projection aperture should be as small as possible.

Moreover, light reflected onto the source may, if the latter has a diffusing surface, be merely directed to the aperture after a single reflection only, or after but few reflections. When the beam projected is to be used for cinematograph or like work, any portion or portions of the reflector body whose shape deviates largely from that of the sphere (as for example at the neck of a glass bulb) should not be silvered; the light reflected by them would be "stray" and produce want of sharpness in the beam.

Where in the appended claims I use the term "other necessary openings" I mean any opening or openings that may be required for the entrance of the source energy, such as the conductors, or for ventilation. The invention is especially useful for light signaling purposes and motion picture projection, but it can be put to many other uses.

While I have described my invention with particularity as to the forms shown, it will be obvious to those skilled in the art, after understanding my invention, that various modifications and alterations may be made therein without departing from the spirit or scope of the invention, and I aim in the appended claims to cover all such modifications.

Having thus described my invention, what I claim as new and desire to secure by Letters Patent, is:

1. In a reflector-lamp the combination of a casing having a concave, optically substantially spherical reflecting surface the area of which is appreciably greater than the reflecting area of half the sphere, and having a light emitting area for the desired beam of light, and a concentrated source of light located centrally of said surface, the source while being concentrated, having sufficient area off the center point to very materially intensify by re-reflected rays the beam of light emitted.

2. In a reflector-lamp the combination of a casing having a concave, optically substantially spherical reflecting surface the area of which is appreciably greater than the reflecting area of half the sphere, and having a light emitting area for the desired beam of light, and a concentrated source of light located centrally of said surface, but with its center located somewhat eccentric to the true center of the reflecting surface so as to substantially increase the rate of "gyration of reflections" of the re-reflected rays.

3. In a reflector-lamp the combination of an inclosing casing for a source of light, a concave optically substantially spherical reflecting surface surrounding said source, the area of said reflecting surface being substantially greater than the reflecting area of half the sphere, and having a light emitting area for the desired beam of light, and a concentrated source of light located centrally of said surface and while being concentrated, having sufficient area off the center point to insure the necessary rate of "gyration of reflections" to very materially intensify by re-reflected rays the beam of light emitted.

4. In a reflector-lamp the combination of an incandescent electric lamp bulb with an electric light emitting conductor therein, a concave optically substantially spherical reflecting surface surrounding said light conductor, the area of said surface being appreciably greater than the reflecting area of half of the sphere, and having a light emitting area for the desired beam of light, said light emitting conductor being arranged so as to constitute a concentrated source and located centrally of said surface, the source being sufficiently concentrated and yet having sufficient area off the center point to increase the intensity of the beam at a point remote from the light to at least twice what it would be without a reflector and with the same energy consumption.

5. In a reflector-lamp the combination of an incandescent electric lamp bulb with an electric light emitting conductor therein, a concave optically substantially spherical reflecting surface surrounding said light conductor, the area of said surface being substantially greater than the reflecting area of half of the sphere, and having a light emitting area for the desired beam of light, said light emitting conductor being arranged so as to constitute a concentrated source and located centrally of said surface, but with its center located somewhat eccentric to the center of the reflecting sphere so as to substantially increase the rate of "gyration of reflections" of the re-reflected rays to intensify the beam of light.

6. In a reflector-lamp the combination of a substantially spherical incandescent electric lamp bulb with an electric light emitting conductor therein, a concave optically substantially spherical reflecting surface surrounding said light source, the area of said surface being substantially greater than the reflecting area of half of the sphere, and having a light emitting area for the desired beam of light, said light emitting conductor being arranged to constitute a concentrated source and located centrally of said surface, and while being concentrated, having sufficient area off the center point to insure the necessary rate of "gyration of reflections" to very materially intensify, by re-reflected rays, the beam of light emitted.

7. In a reflector-lamp, the combination of a casing having a concave reflecting surface that is optically substantially a closed sphere except for a small light emitting area not substantially greater than necessary to emit the desired beam, and further except for any "other necessary small opening," and a concentrated source of light located centrally of said surface, said source while being concentrated, having sufficient area off the center point so as to very materially intensify by re-reflected rays the beam of light emitted.

8. In a reflector-lamp, the combination of an incandescent electric lamp bulb filled with gas and having an electric light emitting conductor therein, a concave optically substantially spherical reflecting surface surrounding said light conductor, the area of said reflecting surface being appreciably greater than the reflecting area of half of the sphere and having a light emitting area for the desired beam of light, said light emitting conductor being arranged to constitute a concentrated source of "open-work" form and located centrally of said surface, the source being sufficiently concentrated and yet having sufficient area off the center point of the reflector to increase with reflected rays the intensity of the beam at a point remote from the lamp to at least twice what it would be without a reflector and with the same energy consumption.

9. In a reflector-lamp, the combination of an incandescent electric lamp bulb having an electric light emitting conductor therein, a concave optically substantially spherical reflecting surface surrounding said light conductor, the area of said reflecting surface being substantially greater than the reflecting area of half of the sphere and having a light emitting area for the desired beam of light, said light emitting conductor being arranged to constitute a concentrated source of "open-work" form, and located centrally of said surface, but with its center located a little eccentric to the true center of the reflecting surface so as to substantially increase the rate of the "gyrations of the reflections" of the re-reflected rays.

10. In a reflector-lamp, the combination of a substantially spherical incandescent electric lamp bulb having a reflecting coating extending over the major portion thereof and having a light emitting area for the desired beam of light, and a light emitting conductor within said bulb arranged to constitute a concentrated source and located centrally of said bulb, the source being sufficiently concentrated and yet having sufficient area off the center point to increase with reflected rays the intensity of the beam at a point remote from the lamp to at least twice what it would be without a reflector and with the same energy consumption.

11. In a reflector-lamp the combination of an incandescent electric lamp bulb with an electric light emitting conductor therein, a concave optically substantially spherical reflecting surface surrounding said light conductor, the area of said surface being appreciably greater than the reflecting area of half of the sphere, and having a light emitting area for the desired beam of light, said light emitting conductor being arranged so as to constitute a concentrated source and located centrally of said surface, and while being concentrated, having sufficient area off the center point to insure the necessary rate of "gyration of reflections" to very materially intensify, by re-reflected rays, the beam of light emitted from the bulb, and optical means adapted to collect and project said rays in a more concentrated beam than that which is emitted from the bulb.

12. In a reflector-lamp, the combination of a substantially spherical incandescent electric lamp bulb having a reflecting coating extending over the major portion thereof and having a light emitting area for the desired beam of light, and a light emitting conductor within said bulb arranged to constitute a concentrated source and located centrally of said bulb, and while being concentrated, having sufficient area off the center point to insure the necessary rate of "gyration of reflections" to very materially intensify, by re-reflected rays, the beam of light emitted, and a cap of heat conducting material closely fitting the upper sector of the bulb to conduct off heat and maintain the spherical form of the bulb.

13. In a reflector lamp, the combination of a substantially spherical incandescent electric lamp bulb having a reflecting coating extending over the major portion thereof and having a small light emitting area for the desired beam of light and a light emitting conductor within said bulb arranged to constitute a concentrated source and located centrally of said bulb, and while being concentrated, having sufficient area off the center point to insure the necessary rate of "gyration of reflections" to very materially intensify, by re-reflected rays, the beam of light emitted from the bulb, and optical means adapted to collect and project said rays in a more concentrated beam than that which is emitted from the bulb.

14. In a reflector-lamp, the combination of a substantially spherical incandescent electric lamp bulb having a reflecting coating extending over the major portion thereof and having a light emitting area for the desired beam of light, and a light emitting conductor within said bulb arranged to constitute a concentrated source of "open-work" form comprising a plurality of spaced coils of filament lying substantially in the same plane, the source being sufficiently concentrated and yet having sufficient area off the center point to increase with reflected rays the intensity of the beam at a point remote from the lamp to at least twice what it would be without a reflector and with the same energy consumption.

15. In a reflector-lamp, the combination of a substantially spherical incandescent electric lamp bulb filled with gas and having a reflecting coating extending over the major portion thereof and having a small light emitting area for the desired beam of light, and a light emitting conductor within said bulb arranged to constitute a concentrated source and located centrally of said bulb, the source being sufficiently concentrated and yet having sufficient area off the center point to increase by reflected rays the intensity of the beam at a point remote from the lamp to at least twice what it would be without a reflector and with the same energy consumption.

16. In a reflector-lamp, the combination of a substantially spherical incandescent electric lamp bulb having a reflecting coating extending over the major portion thereof and having a light emitting opening for the desired beam of light, and a light emitting conductor within said bulb arranged to constitute a concentrated source of "open-work" form comprising a plurality of spaced coils of filament lying substantially in the same plane and located centrally of said bulb, but with its center located a little back of the center of the bulb from the opening, to substantially increase the rate of "gyration of reflections" of the reflected rays and to position its image in front of it.

In testimony whereof I have signed my name to this specification.

HENRY R. EVANS.